(12) United States Patent
Witzel

(10) Patent No.: US 9,204,471 B2
(45) Date of Patent: Dec. 1, 2015

(54) ENABLING A COMMUNICATION SERVER TO USE MSC-S RELATED FUNCTIONS

(75) Inventor: Andreas Witzel, Herzogenrath (DE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 164 days.

(21) Appl. No.: 13/994,896

(22) PCT Filed: Dec. 17, 2010

(86) PCT No.: PCT/EP2010/070101
§ 371 (c)(1),
(2), (4) Date: Jun. 17, 2013

(87) PCT Pub. No.: WO2012/079649
PCT Pub. Date: Jun. 21, 2012

(65) Prior Publication Data
US 2013/0272191 A1   Oct. 17, 2013

(51) Int. Cl.
*H04W 76/02* (2009.01)
*H04L 12/58* (2006.01)
(Continued)

(52) U.S. Cl.
CPC ........... *H04W 76/02* (2013.01); *H04L 12/5815* (2013.01); *H04L 29/125* (2013.01);
(Continued)

(58) Field of Classification Search
CPC ... H04L 51/28; H04L 51/32; H04L 29/12896; H04L 29/12594; H04L 61/106; H04L 61/605; H04L 61/3065; H04L 29/12207; H04L 51/04; H04L 51/38; H04L 61/20; H04L 65/104; H04L 65/1006; H04W 4/18; H04W 8/26; H04W 88/16; H04W 92/02

USPC ................... 370/244, 315, 328, 331
See application file for complete search history.

(56) References Cited

U.S. PATENT DOCUMENTS

| 2007/0190984 A1 | 8/2007 | Ayyasamy et al. |
| 2010/0048176 A1* | 2/2010 | Osborn ................... 455/411 |
| 2011/0069618 A1* | 3/2011 | Wong et al. ............. 370/244 |

FOREIGN PATENT DOCUMENTS

| EP | 2 144 479 A1 | 1/2010 |
| WO | WO 03/043225 A1 | 5/2003 |

(Continued)

OTHER PUBLICATIONS

International Search Report, PCT/EP2010/070101, Sep. 22, 2011.
Written Opinion of the International Searching Authority, PCT/EP2010/070101, Sep. 22, 2011.

*Primary Examiner* — Andrew Chriss
*Assistant Examiner* — Peter Mak
(74) *Attorney, Agent, or Firm* — Myers Bigel Sibley & Sajovec, P.A.

(57) ABSTRACT

The disclosure relates to a method of establishing a circuit switched, CS, call to a mobile subscriber of a CS network, wherein the mobile subscriber includes an instant communication client which is adapted to communicate via an instant messaging protocol with an instant communication server. The instant communication server is associated to a hosting switching node of the CS network. A switching node of the CS network receives a CS setup message for terminating a CS call. A switching node of the CS network detects that the mobile subscriber is not reachable over the CS network. The CS setup message is routed to the hosting switching node. A message converter associated to the hosting switching node converts the CS setup message into a converted setup message according to the instant messaging protocol. The instant communication server forwards the converted setup message to the instant communication client.

15 Claims, 14 Drawing Sheets

(51) Int. Cl.
*H04L 29/12* (2006.01)
*H04W 88/18* (2009.01)

(52) U.S. Cl.
CPC .... *H04L29/12566* (2013.01); *H04L 29/12669* (2013.01); *H04L 51/043* (2013.01); *H04L 61/2564* (2013.01); *H04L 61/2589* (2013.01); *H04L 61/304* (2013.01); *H04W 76/026* (2013.01); *H04L 61/2503* (2013.01); *H04W 88/184* (2013.01)

(56) References Cited

FOREIGN PATENT DOCUMENTS

| WO | WO 2005/079393 | A2 | | 9/2005 |
| WO | WO 2009056932 | A2 | * | 5/2009 |
| WO | WO 2009103347 | A1 | * | 8/2009 |
| WO | WO 2009/130389 | A1 | | 10/2009 |
| WO | WO 2009130389 | A1 | * | 10/2009 |

\* cited by examiner

ENABLING A COMMUNICATION SERVER TO USE MSC-S RELATED FUNCTIONS

CROSS REFERENCE TO RELATED APPLICATION

This application is a 35 U.S.C. §371 national stage application of PCT International Application No. PCT/EP2010/070101, filed on 17 Dec. 2010, the disclosure and content of which is incorporated by reference herein in its entirety. The above-referenced PCT International Application was published in the English language as International Publication No. WO 2012/079649 A1 on 21 Jun. 2012.

TECHNICAL FIELD

The invention relates to establishing a circuit switched, CS, call to a mobile subscriber of a CS network, wherein the mobile subscriber comprises an instant communication client which is adapted to communicate via an instant messaging protocol with an instant communication server, and wherein the instant communication server is associated to a hosting switching node of the CS network.

BACKGROUND

The Extensible Messaging and Presence Protocol (XMPP) is an open Extensible Markup Language (XML) protocol for near-real-time messaging, presence, and request-response services. These services are also named as instant messaging services. The core features of the XMPP are defined in the IETF standard RFC 3920. The basic syntax and semantics were developed originally within the Jabber open-source community. Although XMPP is not wedded to any specific network architecture, to date it usually has been implemented via a client-server architecture wherein a client utilizing XMPP accesses a server over a TCP connection, and servers also communicate with each other over TCP connections. Being an open standard, XMPP has got quite attraction in the open source community world wide and numerous free software packages exist implementing XMPP clients and XMPP server on different platforms. Some companies are basing their chat and voice offerings on XMPP specifications. FIG. 1 shows a schematic diagram of a mobile communication network which is connected to a TCP/IP-based network 100, which can be the Internet or any other TCP/IP based network. In this embodiment, three XMPP servers 111, 121, 131 are connected to the Internet 100. Two XMPP clients 112, 122 are associated to two of the XMPP server 111, 121 via a TCP/IP connection. The XMPP clients 112, 122 can e.g. be a personal computer or a laptop which are connected to the internet 100 via a normal dial-connection. The address 113 of the first XMPP client 112 "client1" is "client1@XMPPserver1.domain/device1" wherein the address 123 of the second XMPP client 122 is "client2@XMPPserver2.domain/device2". In FIG. 1 and in FIG. 4, the addresses 113, 123, 133 are disclosed in a simplified form because the domain indicator and the device indicator are missing for better view. These addresses are in accordance with the standardized XMPP JID (Jabber identity) which is a combination of a user ID, a server ID and a device ID. By these addresses 113, 123, 133 all XMPP clients 112, 122, 132 can be identified and data can be routed via the internet. FIG. 1 further discloses a mobile communication network, wherein only selected components of the mobile communication network are depicted. A mobile terminal or user equipment 18 comprises a XMPP client 132. The XMPP client 132 can be an application which is stored in the UE 18. The XMPP client 132 can be associated to a XMPP server 131 e.g. via a TCP-based connection. The address 133 of the XMPP client 132 is "client3@XMPPserver3.domain/UEdevice". This connection can be realized by a wireless LAN connection, wherein the UE 18 is associated to a WLAN router 19 which is further connected to the Internet 100. Another possibility is that the UE 18 is connected via the radio network 17 to a packet switched (PS) network or to an evolved packet switched (EPS) network. One setup of a PS network is depicted in FIG. 1 by a Serving GPRS Support Node (SGSN) node 15 and Gateway GPRS Support Node (GGSN) 16 which is linked via an IP based core network connection and via the Internet 100 to the XMPP server 131. The embodiment according FIG. 1 further discloses a connection between the SGSN node 15 of a packet switched network and a mobile switching node 14, which can be a MSC-S node 14 of a circuit switched (CS) network. This link between both nodes, which is called Gs interface, depicts the possibility of transferring data between both networks. A further packet switched network is the Evolved Packet Core (EPC) network, wherein one node is the Mobility Management Entity (MME), which can be linked to the MSC-S via a SGs interface. FIG. 1 does not depict further gateway nodes which might be necessary to implement a connection between a circuit-switched network and a packet switched network.

FIG. 2 shows a block diagram of a prior-art mobile switching node 14, which is in this embodiment a MSC-S node 14, wherein only selected parts are depicted. The MSC-S 14 comprises a GSM call control function 143 which contains mobile traffic coordinators for originating and/or terminating calls and emergency calls. The coordinators are mainly used for call transaction setup, call forwarding, call supervision and call release. It allows also direct and handle calls towards other circuit switched networks. The GSM call control function 143 is linked with the core network interface 145 which hosts the core network interfaces of the MSC-S. The core network interface 145 analyses incoming signalling which is either forwarded to another node in the core network or handled locally and terminated at a radio network interface. For outgoing signalling a routing function 146 is consulted to determine the next destination node and the physical interface to reach it. The core network interface 145 is IP (Internet Protocol) based. The GSM call control function 143 is further connected to a GSM mobility function 142 which allows the mobile terminal to roam between radio location areas and to continue ongoing calls also across radio network borders. One main function is the handover procedure to hand over a mobile terminal from one area to another. The GSM mobility function 142 or mobility management function therefore contains a logic coordinator for mobility, roaming and handover procedures and handles the location updating functions and handover functions. Furthermore the GSM mobility function 142 contains functions for packing or unpacking of signalling messages to the terminal and to the radio network belonging to mobility. Signalling messages can be used e.g. in case of authentication, identification and location updating.

The GSM mobility function 142 is connected to the A-/Iu-interface function 141 which hosts the radio network interface resources of the MSC-S 14.

The MSC-S 14 further comprises a charging function 144 which is connected to the GSM call control function 143 and the core network interface 145. The charging function 144 is a basic function in the MSC-S 14 to collect traffic case related data to be used for offline billing.

The MSC-S 14 further comprises a VLR data storage 147 which stores the subscriber data. The VLR 147 is connected to a home location register 4 (HLR) which is a central database that contains details of each mobile phone subscriber that is authorized to use the core network.

The MSC-S further comprises a GSM authentication component 148 which implements the GSM authentication algorithm. The GSM authentication component 148 is also connected to the HLR 4 to receive and verify authentication data from the central database.

FIG. 3 depicts a block diagram of a well known XMPP server 131. The XMPP server 131 contains a XMPP stanzas router 1311 which is the backbone of the XMPP server 131. The XMPP stanzas router 1311 accepts connections from XMPP server components and passes XML (extended markup language) packets between XMPP server components. A client to server component (c2s) 1312 handles communication with associated XMPP clients. The XMPP stanzas router 1311 is connected to a XMPP session manager 1316. The session manager 1316 implements the bulk of the instant messaging features like message passing, presence, roster and subscription. The session manager 1316 is connected to data storage in order to provide persistent data storage. The associated data storage is not depicted in FIG. 3. It could be located outside the XMPP server 131 or it could be part of the XMPP server 131. Additionally the session manager 1316 handles the XMPP extensions of service discovery and privacy lists. A c2s component 1312 is connected to the XMPP stanzas router 1311 and is e.g. responsible for connecting XMPP clients 112, 122, 132 to the XMPP server 131, passing communication packets to a session manager 1316 of the XMPP server 131, authenticating XMPP clients 112, 122, 132, registering users and triggers activity with the session manager 1316. A server to server (s2s) component 1315 is connected to the XMPP stanzas router 1311 and handles communications with external XMPP servers by passing communication packets between other internal components and external servers. The s2s component 1315 further performs dial-back function to authenticate remote XMPP servers. A multi user chat (muc) 1314 is connected to the XMPP stanzas router 1311 to implement support for chat rooms. A publish subscribe component (pubsub) 1313 implements a generic functionality for providing presence. The pubsub component 1313 is connected to the Stanzas router 1311. The XMPP server 131 is connected via a TCP/IP connection to the Internet 100 such that it possible to reach this server from any other device connected to the Internet 100. The s2s component 1315 and the c2s component 1312 communicate via the Internet 100 with external clients 112, 122, 132 and external server 111, 121.

A XMPP extension named Jingle is defined in the XMPP standards to realize a Voice over IP session between XMPP clients. It is therefore possible to exchange media data like Voice or Video data between XMPP clients. The XMPP clients who might be integrated in mobile terminals can therefore take over the functionality of normal voice clients in a mobile terminal. A Voice over IP communication based on the XMPP protocol is today only possible between clients using XMPP. If an originating CS mobile subscriber wants to establish a call to a destination CS mobile subscriber with an integrated XMPP client, the terminating CS call fails if the destination CS mobile subscriber is not reachable even if the destination CS mobile subscriber is reachable over a XMPP connection.

One further problem of a client to client connection between two XMPP client, controlled by a XMPP server, is that if one client is located in a private Local Area Network (LAN) which is protected via a firewall against the public Internet, a Network Address Translation (NAT) could be performed. The NAT translates requests from within the LAN using private IP addresses to requests towards the Internet using a public IP address. This public IP address is received from the Internet Service Provider (ISP) at attach, e.g. at DSL line activation. Without knowledge of the public IP address, the XMPP Voice over IP (VoIP) clients has nothing to offer in the user plane establishment signalling. Technologies to circumvent this problem is a Session Traversal Utilities for NAT (STUN) which allows a client to ask the NAT firewall about public IP address and opening of pin-holes in the firewall for user plane connections. However, very few NAT firewalls today support STUN. Furthermore, due to the related security threat when opening holes in the firewall, STUN is actively disabled in many networks. So practically XMPP clients with VoIP features fail to establish user plane behind firewalls.

SUMMARY

It is an object of the present invention to improve a CS call establishment. This object is achieved by the independent claims. Advantageous embodiments are described in the dependent claims.

One embodiment of the invention relates to a method of establishing a circuit switched, CS, call to a mobile subscriber of a CS network, wherein the mobile subscriber comprises an instant communication client which is adapted to communicate via an instant messaging protocol with an instant communication server. The instant communication server is associated to a hosting switching node of the CS network. The method comprises the steps of receiving, by a switching node of the CS network, a CS setup message for terminating a CS call, detecting, by a switching node of the CS network, that the mobile subscriber is not reachable over the CS network, routing the CS setup message to the hosting switching node, converting, by a message converter, associated to the hosting switching node, the CS setup message into a converted setup message according to the instant messaging protocol and forwarding, by the instant communication server, the converted setup message to the instant communication client. The mobile subscriber can be any kind of mobile terminal with an integrated CS client and an integrated instant messaging client. The message converter in the hosting switching node can be any kind of hardware or software which is adapted to convert messages from one protocol version to another protocol version. The message converter can convert messages in both directions. The CS setup message stands for any kind of message which is used to setup a CS call in a CS network and comprises e.g. the address of the destination node, the address of the originating node, some routing information and other parameters which are used to allocate resources for the CS call in the network nodes.

In a further embodiment the detection if the mobile subscriber is reachable is done by checking the subscriber data in a Home Location Register, HLR, if an address of a switching node serving the mobile subscriber is available. In the HLR the subscriber data is stored including a serving node which serves the mobile subscriber. If the mobile subscriber is not CS attached, no entry will be found in the HLR. Therefore checking the entry for a mobile subscriber in the HLR will provide the information whether a mobile subscriber is CS attached or not.

In a further embodiment the detection if the mobile subscriber is reachable is done by determining, by the switching node, that the mobile subscriber is attached to a Long Term Evolution, LTE, radio access. For a mobile subscriber, attached to the LTE radio access which is a packet switched network, it is not possible to answer a CS call without falling back to a CS network. Further the switching node can be connected via an interface to a Mobility Management Entity, MME of a Service Architecture Evolution, SAE, network. This connection is known as a SGs interface. If a switching node has an open SGs interface to a MME of a SAE network the mobile subscriber is reachable via the switching node over the SGs interface but it is not possible to terminate an incoming CS call to the MME attached mobile subscriber.

In a further embodiment the routing is performed by replacing, in the CS setup message, the address of the mobile subscriber by the address of the hosting switching node. It is therefore obvious for the hosting switching node, when receiving a CS setup message which comprises the address of the hosting switching node as the destination address that a CS connection is not possible. The address of the mobile subscriber can be nevertheless additionally stored in the CS setup message. The CS setup message further comprises the address of the instant communication client which might be an IP address. This address can be fetched from the HLR before.

In a further embodiment the routing is performed by adding a prefix number to the mobile subscriber address in the CS setup message. This prefix number can be used to route the CS setup message to the hosting switching node. It is proposed to have just a few hosting switching nodes in the CS network.

In a further embodiment the method further comprises the steps of receiving, by the instant communication server, a setup accept message from the instant communication client, converting the setup accept message into a CS setup accept message and forwarding the CS setup accept message to an originator of the CS setup message. The converting of the setup accept message into a CS setup accept message can be performed by the same message converter which already converts the CS setup message into a setup message according to the instant communication protocol.

In a further embodiment the method further comprises the steps of receiving, by the instant communication server, a relay request from the instant communication client, selecting, by the hosting switching node, a media gateway node, MGW, which is controlled by the hosting switching node, allocating, by the hosting switching node, a relay function in the MGW, determining, by the hosting switching node, an address of a local port of the relay function to which the instant communication client can be terminated and an address of a remote port of the relay function to which the message converter can be terminated and providing, by the instant communication server, the address of the local port and the address of the remote port to the instant communication client. A hosting switching node is able to control more than one media gateway node. The determination of the local and remote address can also be performed by the MGW which returns the addresses to the hosting switching node.

In a further embodiment the method further comprises the step of sending, by the instant communication client, a message to the message converter which comprises the address of the remote port of the relay function.

In a further embodiment of the invention the instant messaging protocol is based on a packet switched, PS, network. Further the instant messaging protocol is an Extensible Messaging and Presence Protocol, XMPP, and the communication server is a XMPP server and the communication client is a XMPP client.

In further embodiment a hosting switching node of a circuit switched, CS, network is provided which comprises an instant communication server which is adapted to communicate over an instant communication protocol with an instant communication client. The instant communication client is associated to a mobile subscriber of the CS network. It is possible that the instant communication client is a software application stored in the mobile subscriber or mobile terminal and is adapted to communicate via a packet switched link with a instant communication server. The hosting switching node further comprises a message converter which comprises a receiver, adapted to receive a CS setup message for setup a CS call to the mobile subscriber. The message converter also comprises a processor, adapted to convert the CS setup message into a converted setup message which is based on the instant messaging protocol and a transmitter, adapted to transmit the converted setup message to the instant communication server.

In a further embodiment, the instant communication server is adapted to send the converted setup message to the instant communication client. This is to provide the instant communication client with all relevant information to setup a communication.

In a further embodiment the hosting switching node is adapted to perform all the steps of the prescribed methods.

In a further embodiment, a media gateway, MGW, node of a circuit switched network, CS, is proposed which is controlled by a hosting switching node of a CS network, comprising a receiving unit, adapted to receive a request for providing a relay function between an instant communication client and a message converter associated to the hosting switching node, a processing unit, adapted to determine an address of a local port to which the instant communication client can be terminated and an address of a remote port to which the message converter can be terminated, a relay function, adapted to relay media data between the local port and the remote port and a sending unit, adapted to send to the switching node the address of the local port and the address of the remote port. The relay of media data is performed without any coding or decoding of data.

The present invention also concerns computer programs comprising portions of software codes in order to implement the method as described above when operated by a respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

In the following, detailed embodiments of the present invention shall be described in order to give the skilled person a full and complete understanding. However, these embodiments are illustrative and not intended to be limiting.

DETAILED DESCRIPTION

Figure 1:
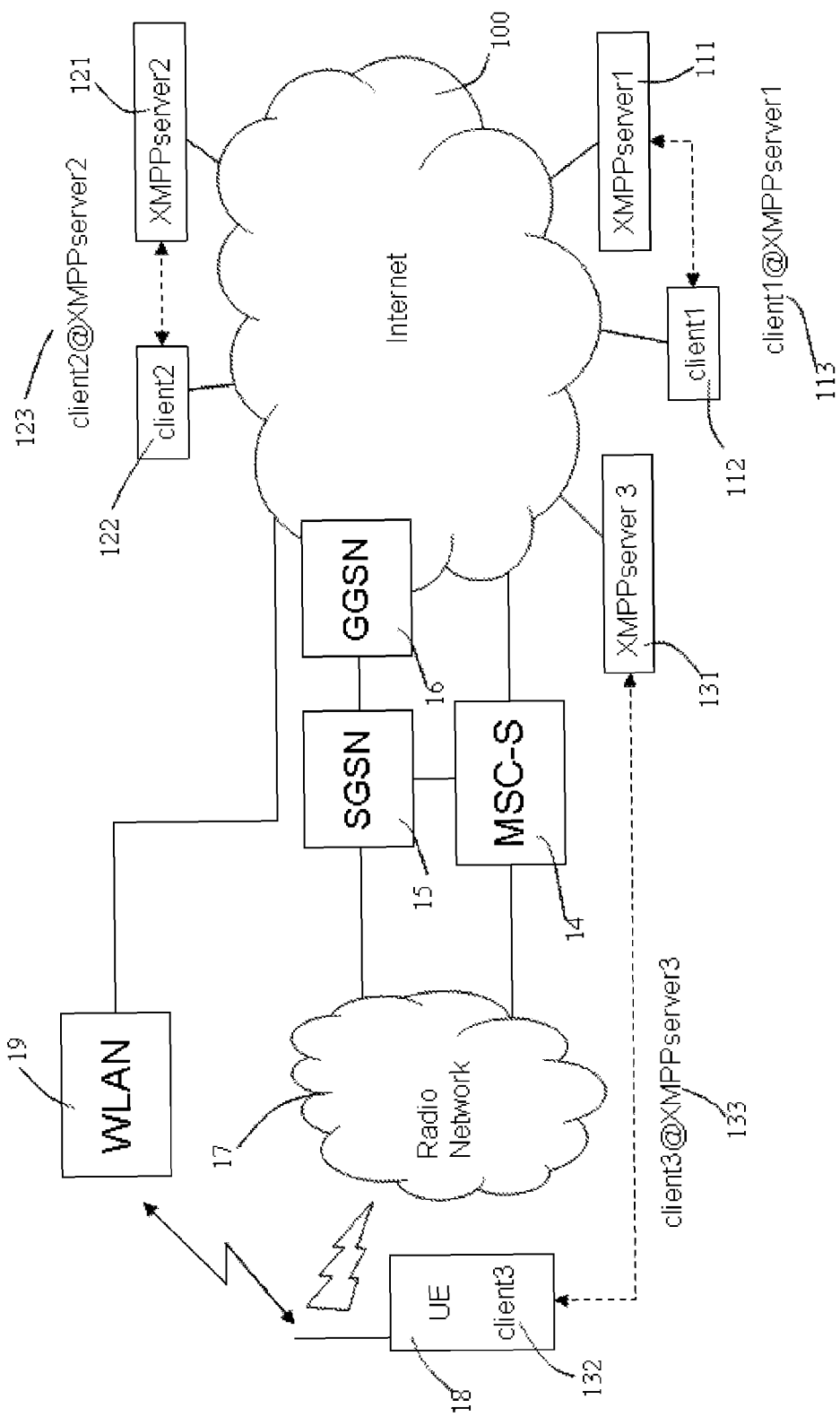
FIG. 1 shows a schematic diagram of a mobile communication network which is connected to a TCP/IP-based network according to the prior art.
Figure 2:
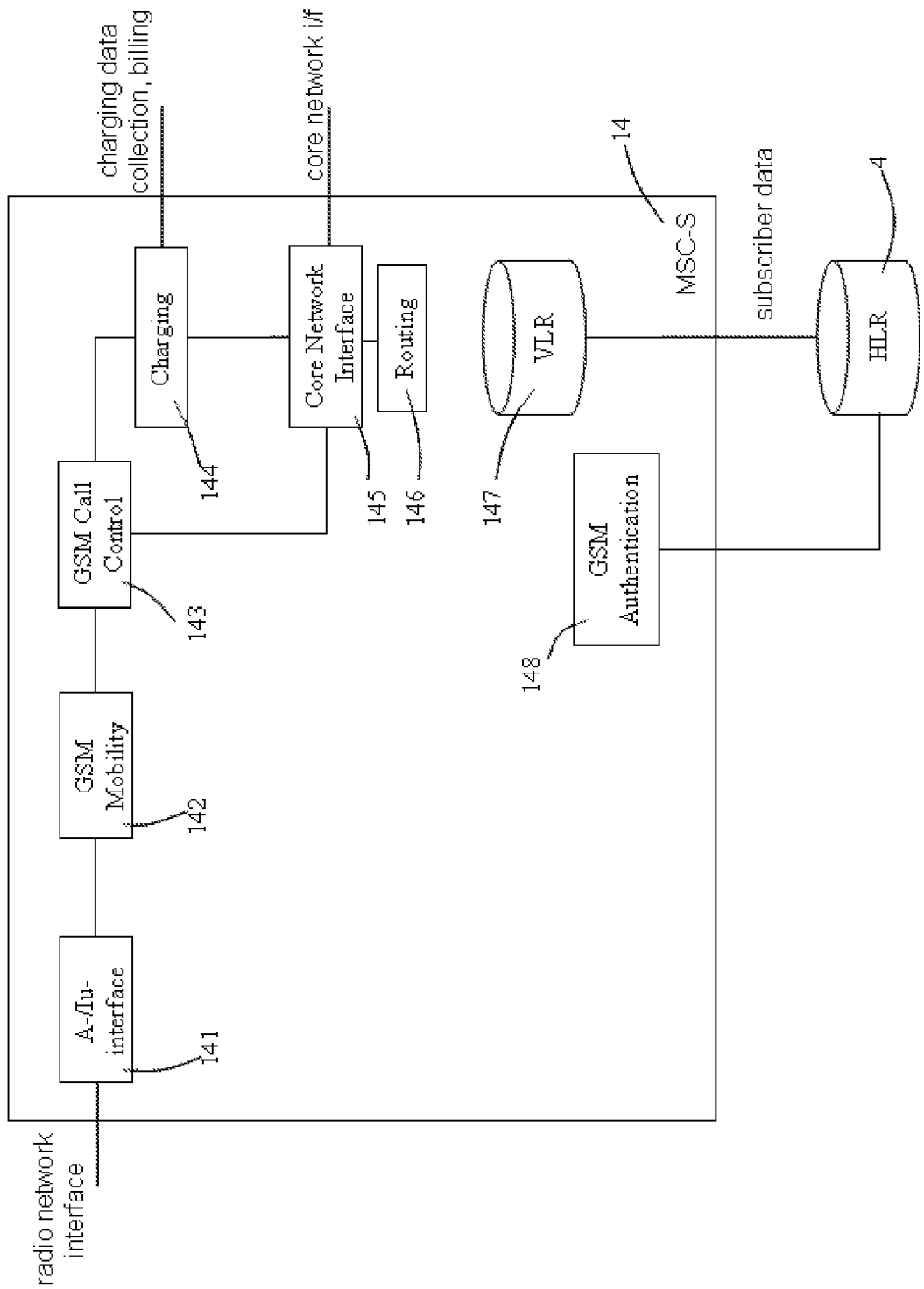
FIG. 2 shows a block diagram of an embodiment of a mobile switching node without an integrated communication server according to the prior art.
Figure 3:
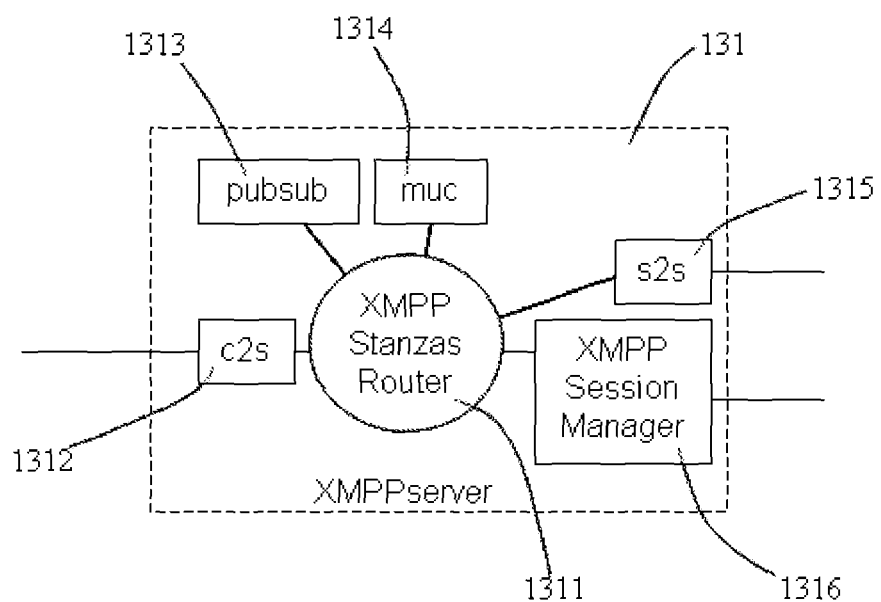
FIG. 3 shows a block diagram of an embodiment of a communication server according to the prior art.
Figure 4:
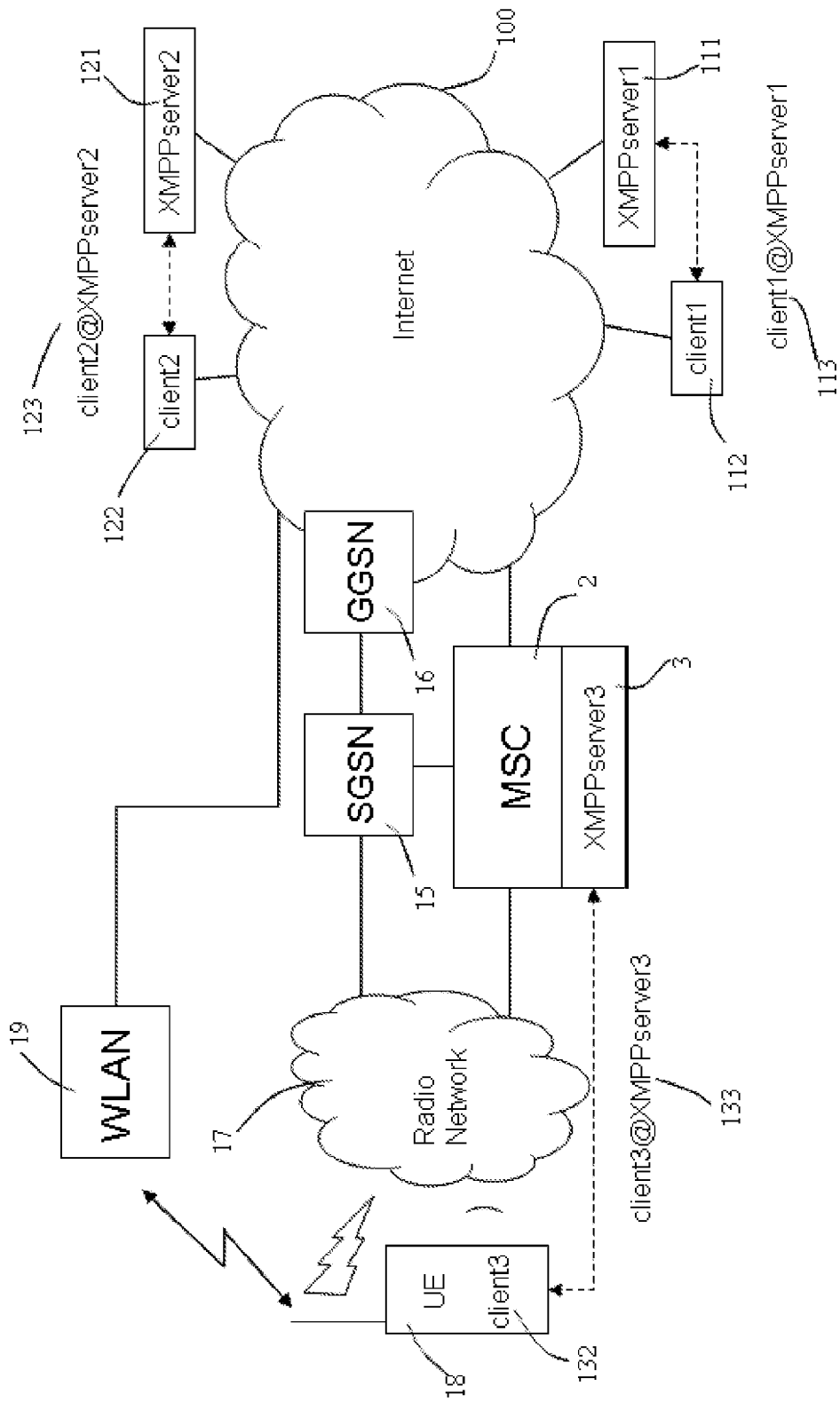
FIG. 4 shows an embodiment of a schematic diagram of a mobile communication network which is connected to a TCP/IP-based network.

FIG. 4 depicts one embodiment of the invention. The third XMPP server 3 is associated to the MSC-S 2 of a mobile communication network which can also be understood as an MSC. It is possible that the XMPP server 3 is an integral part of the MSC-S 2. Therefore the MSC-S 2 is enhanced by the XMPP server 3. The XMPP server 3 can also be a server node which is logically associated to the MSC-S 2 to use some of the MSC-S functions. The embodiment according FIG. 4 further discloses a Gs-connection between the SGSN node 15 of a packet switched network and the MSC node 2 of a circuit switched network. This link between both nodes depicts the possibility of transferring data between both mobile networks. FIG. 4 does not depict further gateway nodes which might be necessary to implement a connection between a circuit-switched network and a packet switched network. Another alternative for a packet switched network is the EPC network which comprises a MME. The MME is connected via a SGs interface to the MSC-S 2. This alternative is not depicted in FIG. 4.

Figure 5:
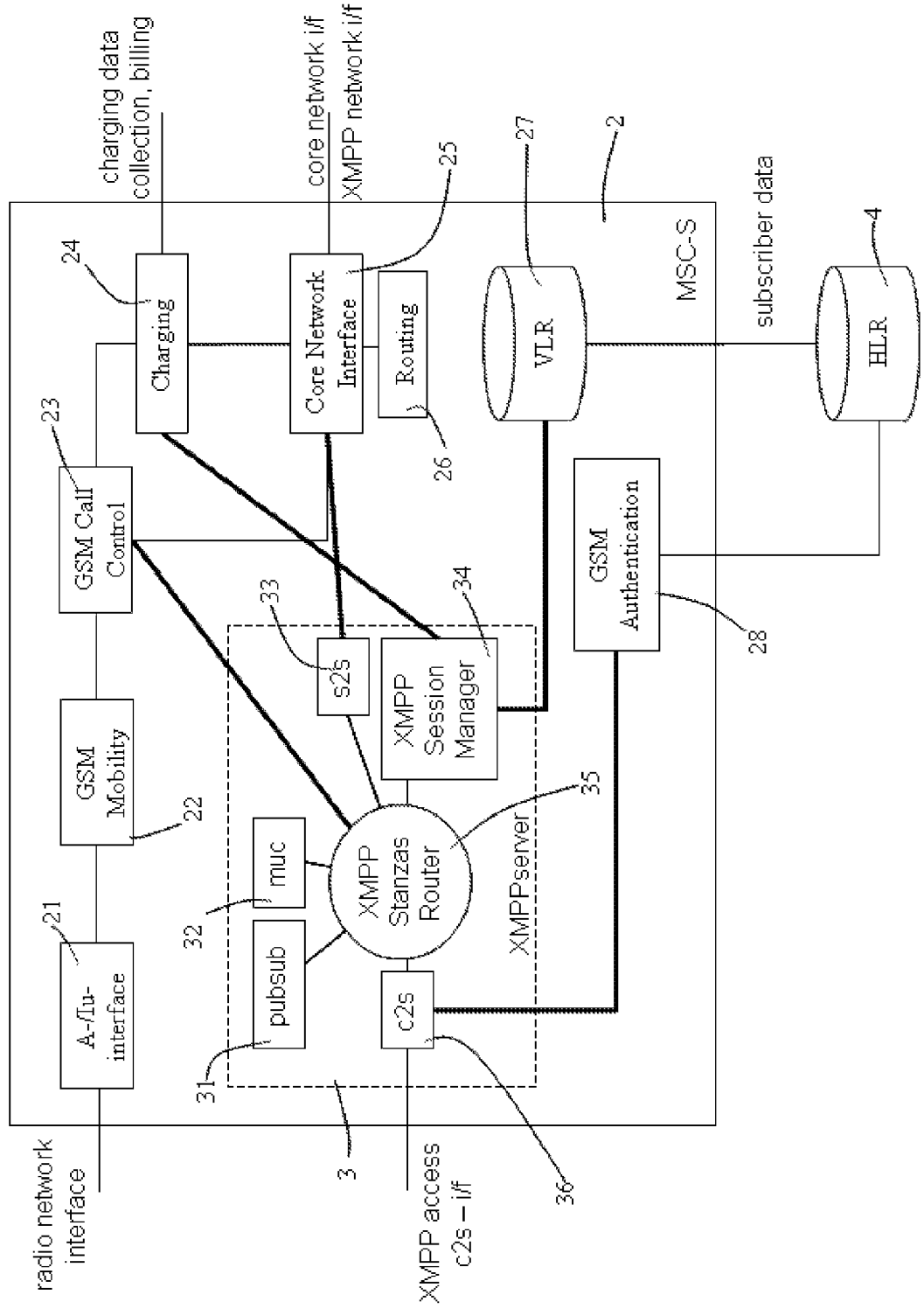
FIG. 5 shows a block diagram of an embodiment of a mobile switching node with an integrated communication server.

FIG. 5 depicts one embodiment of MSC-S 2 with an integrated XMPP server 3. The XMPP server 3 can be a separate module which is inserted as a hardware component into the MSC-S hardware. The XMPP server 3 could also be a separate plug in card which can be inserted into a rack which comprises among others several MSC-S plug-in cards. The XMPP server 3 must be logically associated to the MSC-S 2. In the embodiment of FIG. 5 the XMPP stanzas router 35 of the XMPP server 3 is connected to the GSM call control function 23 of the MSC-S for XMPP-CS interworking to perform the conversion between the XMPP protocol and the CS protocol at breakout. Further the XMPP session manager 34 of the XMPP server 3 is connected to the charging function 24 of the MSC-S 2 to add XMPP related data to the charging information. E.g. when the session manager 34 reports information about a chat session to the charging function of the MSC-S 2 the operator of this mobile network is able to charge e.g. the duration of the chat or the number of chat messages.

The XMPP session manager 34 is further connected to the visitor location register (VLR) 27 of the MSC-S 2. The VLR 27 is associated to the MSC-S 2 and can be located inside the MSC-S 2 or can be an outside entity which is e.g. inserted into a rack which comprises among others the MSC-S 2 plug in card. This subscriber storage area can now be used as persistent data storage for the XMPP protocol such as offline messages or privacy lists.

The GSM authentication function 28 of the MSC-S 2 is connected via the c2s component 36 with the XMPP stanzas router 35. The GSM authentication function 28 can be used by the c2s component 36 to authenticate a XMPP client or user.

The XMPP stanzas router 35 is connected via the s2s component 33 with the core network interface 25 and the routing function 26 of the MSC-S. The routing function 26 acts in support of the s2s component to resolve hostnames for the s2s component 25 as part of the XMPP dial-back authentication. The dial-back authentication, as mentioned in the RFC standard 3920, is for verification of the identity of an originating XMPP server. The s2s component 33 can reuse the existing IP network interface of the MSC-S node and the core network of the mobile communication network to send communication data to another XMPP server 111, 121 which can be located anywhere in the Internet 100 or in another node of the same or another mobile communication network.

Figure 6:
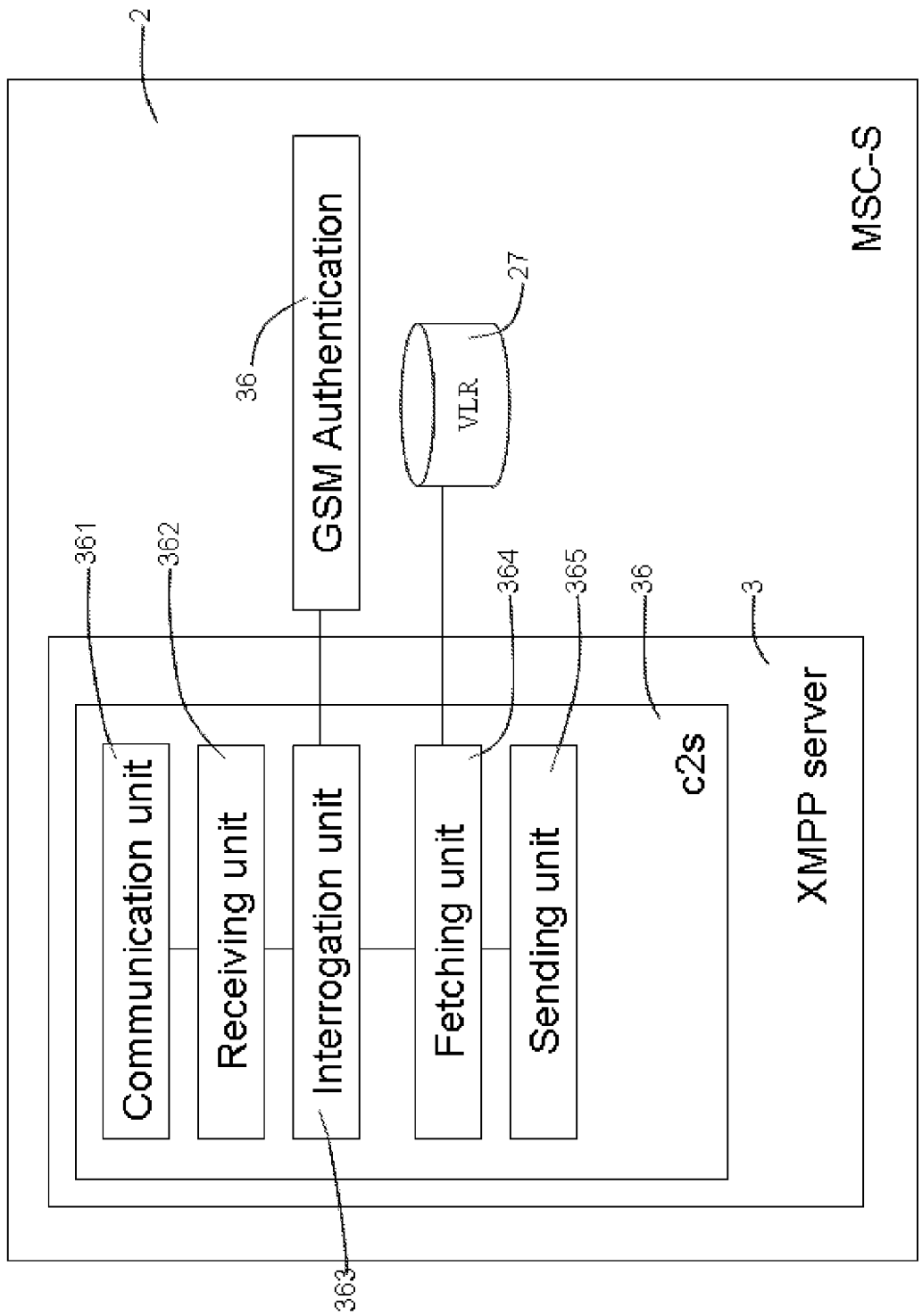
FIG. 6 shows a block diagram of an embodiment of a mobile switching node with an integrated communication server.

FIG. 6 depicts an embodiment of a mobile switching node, MSC-S, 2 of a circuit-switched network, CS, comprising a communication server 3. The communication server 3 is associated to the MSC-S 2 (e.g. integrated into the MSC-S 2). The communication server 3, which could be a XMPP server, is adapted to register with a communication client 132 which can be a XMPP client over a client to server component 36. The XMPP client 132 is not shown in this figure. The client to server component 36 comprises a communication unit 361, adapted to initiate or establish a connection to the XMPP client 132. The establishment of the connection could be initiated by the XMPP client 132 or by the XMPP server 3. The establishment of a communication means that the communication unit 361 helps to build-up a communication with the XMPP client 132. The client to server component 36 further comprises a receiving unit 362 which is adapted to receive identification information from the XMPP client 132 via the connection. The identification information could be the Jabber ID or any other kind of identification, which is described in some of the next paragraphs. Further the client to server component 36 comprises an interrogation unit 363 which is adapted to interrogate an authentication module 28 of the MSC-S 2 to perform a user authentication. The client to server component 36 further comprises a fetching unit 364, adapted to fetch subscriber information from a database 27. The database is in this embodiment the VLR of the MSC-S 2. A sending unit 365 at the client to server component 36 is adapted to send subscriber information to the XMPP client 132 via the connection. The connection could be a TCP connection.

In the following, some use cases are described in detail. The use cases below do not cover all XMPP capabilities but focuses on those use cases where MSC-S functions can be reused.

In a first use case, a XMPP client 132 which is implemented on a mobile phone or mobile terminal 18 wants to register at a XMPP server 3 which is associated to the MSC-S of a mobile communication network. It is not necessary that the mobile terminal is CS associated to this network. To register the XMPP client 132 at the XMPP server 3 the client 132 has to construct an identity which is called the Jabber identity. The Jabber ID looks like the following: "user@jabberserver.tld/device". The term "user" identifies the user of this service, "jabberserver" refers to the domain name of the XMPP server 3 and "device" represents the actual device the user is using for the registration request. The term "tld" stands for a top level domain which could be a .com or .de domain or any other known domain. A user may have several parallel registrations via different devices or different XMPP client instances on the same device.

To construct the Jabber ID, the XMPP client 132 could use information from the SIM card of the mobile phone 18. The subscriber identity module (SIM) card contains e.g. the MSISDN number or the IMSI which can be user by the XMPP client 132 to construct a "user" for the Jabber ID. The MSISDN number is the Mobile Subscriber Integrated Services Digital Network Number. The IMSI is the abbreviation for the International Mobile Subscriber Identity. The domain name can be derived from the GPRS domain name of the Access Point Name (APN) as defined and stored also on the SIM card. The device can be constructed from the International Mobile Equipment Identity (IMEI) of the mobile phone. The constructed Jabber ID may look like the following: IMSI@XMPP.APNdomain.com/IMEI.

Another option would be that the operator sends a configuration text message, e.g. a SMS message, to configure the XMPP client on the mobile phone 18. This option leaves more freedom in the way the Jabber ID is constructed. Subscribers can then be distributed to multiple domains or domains different to the APN domain.

To register the XMPP client 132 at the XMPP server 3 associated to the MSC-S 2, the XMPP client 132 opens a connection to the XMPP server 3 in the MSC-S 2. The mobile terminal 18 uses a normal packet switched connection. This connection can be based on the Transmission Control Protocol (TCP) and can be established via a wireless LAN connection of a WLAN router 19 through the Internet 100 to the c2s component 36 of the XMPP server 3. Another way of connecting the XMPP client 132 to the XMPP server 3 is an established radio connection to a packet core network. The SGSN 15 and the GGSN 16 route the TCP connection the c2s component 36 of the XMPP server 3. The c2s component 36 handles this connection request and interrogates the GSM authentication module 28 of the MSC-S 2 to perform user authentication. The GSM authentication function 28 of the MSC-S 2 may have to retrieve authentication triplets from AUC via the home location register (HLR) 4. After successful authentication subscriber information is fetched from the database 27, e.g. the VLR, and the subscriber information is sent to the XMPP client 132 via the connection.

After the XMPP client 132 has been registered to the XMPP server 3 in the MSC-S 2, the mobile subscriber can start a chat session to any other already registered XMPP client. In case both clients are associated to the same XMPP server 3, the chat session is local to that XMPP server 3. The c2s component 36 receives chat related XMPP stanzas and will forward them to the XMPP session manager 34 via the XMPP stanzas router 35. The session manager 34 will determine whether the destination Jabber ID is currently available or offline.

Offline messages are stored in the VLR data storage 27 and will be delivered once the destination becomes available. If the destination JID is reachable, the session manager 34 forwards the message to the destination, via the stanzas router 35 and the responsible c2s instance of function 36.

The session manager 34 stays in control of the entire chat session. The session manager could report information about the chat session to the charging function 24 in the MSC-S 2. The operator is now able to charge e.g. duration of the chat, or the number of chat messages. It is also possible (not shown in the figures) to report the details of the chat session to a legal interception point.

In case the destination Jabber ID is not registered at the same local XMPP server 3, the XMPP session manager 34 tries to route the chat message to the destination XMPP server. This is done via the XMPP stanzas router 35 and the s2s component 33. The s2s component 33 reuses the existing IP core network interface 25 of the MSC-S 2. Also the same routing functional component 26 of the MSC-S 2 is reused in order to resolve the destination address and determine the appropriate physical core network interface. Also in this case charging information is collected and provided to the charging function 24, and legal interception, if applicable, can be performed.

Similar actions are performed if a remote XMPP client wants to reach the local associated XMPP client 132. In this case the message arrives at a core network interface 25 of the MSC-S 2. The routing function 26 determines that this message is targeted to the internal XMPP server 3 and forwards the message to the s2s component 33, which forwards it via the XMPP stanzas router 35 to the XMPP session manager 34.

In the context of XMPP, a Jingle call is handled in the same way as a chat session. A Jingle call is a peer-to-peer call between XMPP clients, where the negotiation occurs over the XMPP signalling channel and the media is exchanged over a data channel that is usually a dedicated non-XMPP transport channel. Therefore a Jingle call can also be termed as a Voice over IP call. Further information about the Jingle call is mentioned in the XMPP standard XEP-0166. The user plane details are negotiated end-to-end via the XMPP server, without XMPP server involvement. Also the user plane addresses are exchanged directly between the XMPP clients. In case the XMPP client is behind a firewall with NAT a relay service can be requested from the XMPP server which is, in this case, involved in the communication. Therefore the above described use cases for local and remote chats are also applicable for this use case. This applies also for the direction from a remote client towards a local client. Also the data collection for input to the charging function in the MSC-S can be used. The legal interception of the user plane has to be performed by devices in the IP backbone, to mirror the IP packet flow between the clients. Offline correlation is required to relate the collected XMPP Jingle signalling information with the IP flows.

One essential benefit of the XMPP enabled MSC-S 2 is that it efficiently allows to provide interworking between XMPP clients using Jingle for call setup and the existing fixed or wireless telephony networks.

On the other hand the XMPP server 3 integrated in the MSC-S 2 shall be based as much as possible on existing definitions, in order to allow reuse of already available XMPP server 3 implementations (open source or commercial products). The XMPP-concept of XMPP server component-connections is used to interconnect the MSC-S parts with the XMPP server 3 to provide legacy network breakout.

The XMPP standard XEP-0114 defines a Jabber Component Protocol. This protocol allows connecting external server components to a XMPP server 3. So the GSM Call Control function 23 of the MSC-S 2 uses this protocol to be connected to the XMPP server 3. When establishing the connection, the GSM Call Control function 23 registers a specific sub-domain of the XMPP server domain. Whenever the XMPP server 3 receives a stanza addressed with this registered sub-domain, the stanza will directly be routed by the stanzas router 35 to the external component GSM Call Control function 23.

For the interworking as such the Gateway Interaction according to the XMPP standard XEP-0100 provides additional information. E.g. when the XMPP client 132 wants to address an E.164 number in a Jingle call, it will use the following format: "E164Address@CSgateway.domain.com". The term "E164Address" is the telephone number in accordance with the E.164 standard of the ITU-T, "CSgateway" is the sub-domain registered by the GSM Call Control function 23 when connecting as a component to the XMPP server 3. The term "domain" would be the domain used by the operator for his XMPP service. When the GSM Call Control function 23 received the Jingle call request, it will decide based on a destination number analysis whether to route it to the core network interface 25 located in the MSC-S 2 or, if the destination is a mobile terminal 18 associated to the same MSC-S 2, terminate it locally.

XMPP clients can use the Service Discovery mechanism in accordance with the XMPP standard XEP-0030 to discover the telecom breakout service offered by the XMPP server 3 integrated in the MSC-S 2. In this scenario the existing charging and legal intercept mechanisms can be fully reused.

Instead of storing the XMPP Server related subscriber data into the VLR 27 allocated to the MSC-S 2, it also possible to store it into an external database. One important embodiment of an external database is the Common Usage Database (CUDB), which is also used in mobile networks to centralize all subscriber data. Access to the CUDB is done via HLR-front-ends in a backward compatible way. If a network deploys a front-end-central database approach it would also prefer to store the XMPP data into such CUDB. The XMPP server data can be stored and access e.g. using a Lightweight Directory Access Protocol (LDAP) or other commonly used database access protocols.

Figure 7:
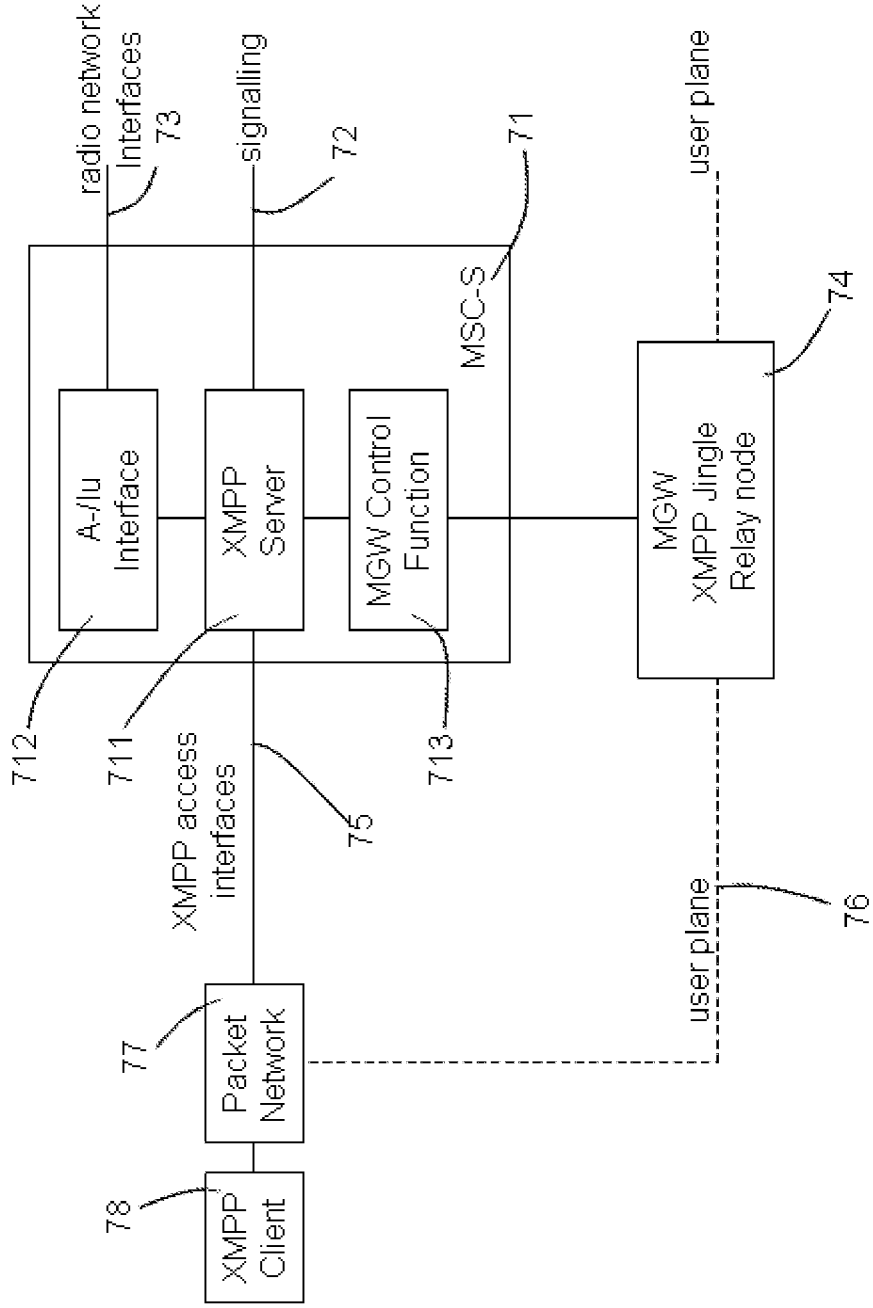
FIG. 7 shows a block diagram of an embodiment of a mobile switching node with an integrated communication server and an associated media gateway node.

FIG. 7 depicts a XMPP client 78 which is connected over a packet network 77 which can be e.g. a mobile packet core, a DSL access or an Internet connection, via a XMPP access interface 75, like the prescribed c2s interface 36 to a XMPP server 711. The XMPP server 711 is associated with a mobile switching node 71, which is in this example a MSC-S. The MSC-S 71 further comprises an A-/Iu Interface 712 for connecting the MSC-S 71 via a radio interface to a mobile subscriber. The mobile subscriber can be associated to the same terminal which also includes the XMPP client 78. The MSC-S 71 further comprises a MGW Control function 713 which is adapted to control a media gateway node 74, also named as MGW node. It is possible that the MSC-S 71 controls more than one MGW 74 over the MGW Control function 713 to handle the user plane for CS calls. The MGW Control function 713 is adapted to control MGW nodes 74 by using commands in accordance with the H.248 protocol.

The associated XMPP Server 711 which also can be any kind of instant communication server supports a relay services, which can be the XMPP Jingle Relay Service as described in the XMPP standard XEP-0278. This Relay Service can be discovered by the XMPP client via the XMPP service discovery mechanism in accordance with the XMPP standard XEP-0030. The MGW 74 is connected via the user plane 76 with the packet network 77.

Figure 8:
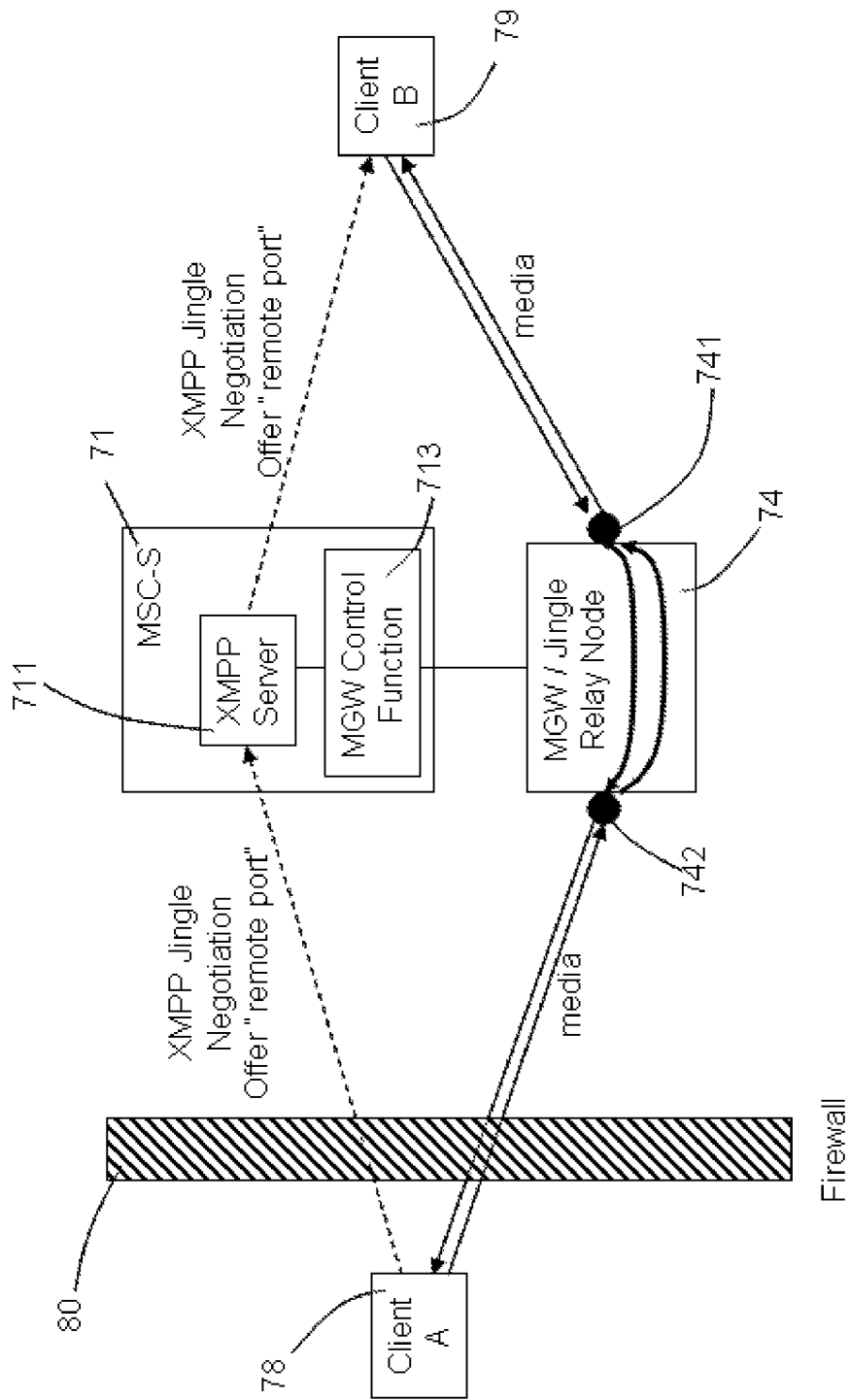
FIG. 8 shows a block diagram of an embodiment of a mobile communication network with two communication clients which are connected via a XMPP server and a Relay node.

FIG. 8 depicts another embodiment of the invention and shows two XMPP clients 78, 79, which are connected to a XMPP server 711. The XMPP server 711 is part of the MSC-S 71. Media data can be routed between both clients 78, 79 over a Jingle relay node 74. Client A 78 can be terminated via a local port 742 at the Jingle relay node 74. Client B 79 can be terminated via a remote port 741 at the Jingle relay node 74. Both ports 741, 742 comprise an address, preferably an IP address. The XMPP client A 78 is located behind a firewall 80. It is possible that the XMPP client A 78 is part of a private local IP area network (LAN) network. In a LAN, all participants or nodes comprise private IP addresses which are not reachable from the Internet. It is possible that this private LAN is connected via a router to the internet wherein the router comprises a Network Address Translation (NAT) component. This NAT component translates private addresses and ports into one available public address which is normally used by the Internet service provider through which the private network is connected to the Internet. By translating Internet addresses, a node inside the private network is able to communicate with servers or nodes in the public Internet without being visible. The firewall 80 can be part of the NAT component because it prevents directs accesses to the protected nodes in the private LAN behind this firewall 80.

If the XMPP client A 78 which is located behind the firewall 80 wants to initiate a Jingle call to client B 79, which can be a Voice over IP call or any other media call, it will request a relay service from the XMPP server 711 because a direct connection to the client B 79 is not possible due to the firewall 80 which protects the private LAN in which client A 78 is located. Client B 79 cannot use the private IP address of client A 78 to reach client A 78 and therefore cannot establish a direct media connection to client A 78.

The XMPP server 711 uses the MGW control function 713 of the MSC-S 71 to allocate media relay in the MGW node 74 which now works as a Jingle Relay node 74 by sending H.248 commands to the Jingle Relay node 74. The Jingle Relay node 74 seizes a context and two IP terminations 741, 742, wherein a local IP termination 742 can be used to terminate client A 78 and a remote IP termination 741 can be used to terminate client B 79. The Jingle Relay node 74 returns the IP addresses and port numbers of the possible local and remote IP terminations 741, 742 via the H.248 protocol to the MSC-S 71 which forwards the information to the XMPP server 711. The XMPP server 711 sends the information to the client A 78 as host address, remote port and local port of the relay service. After the client A 78 received the information the further Jingle call setup negotiation is performed. Client A 78 sends the address of the remote port 741 via the XMPP server 711 to the client B 79 such that client B 79 is able to terminate its media connection to the Jingle Relay node 74 instead of terminating its media directly at the client A 78. Client A 78 will terminate its media connection at the local port 742 of the Jingle Relay node 74. The Jingle Relay node 74 now establishes a routing between both ports 741, 742.

If legal interception has to be applied for the Jingle call, the MSC-S 71 can instruct the Jingle relay node or MGW node 74 to tap off the media stream and send them to a monitoring center.

In case the Jingle call is targeted to the legacy CS network in form of an E.164 number, the MGW node 74, used as the Jingle relay node, can also be used as a normal MGW node 74 in the CS as part of the call to route the payload or bearer signals.

Figure 9:
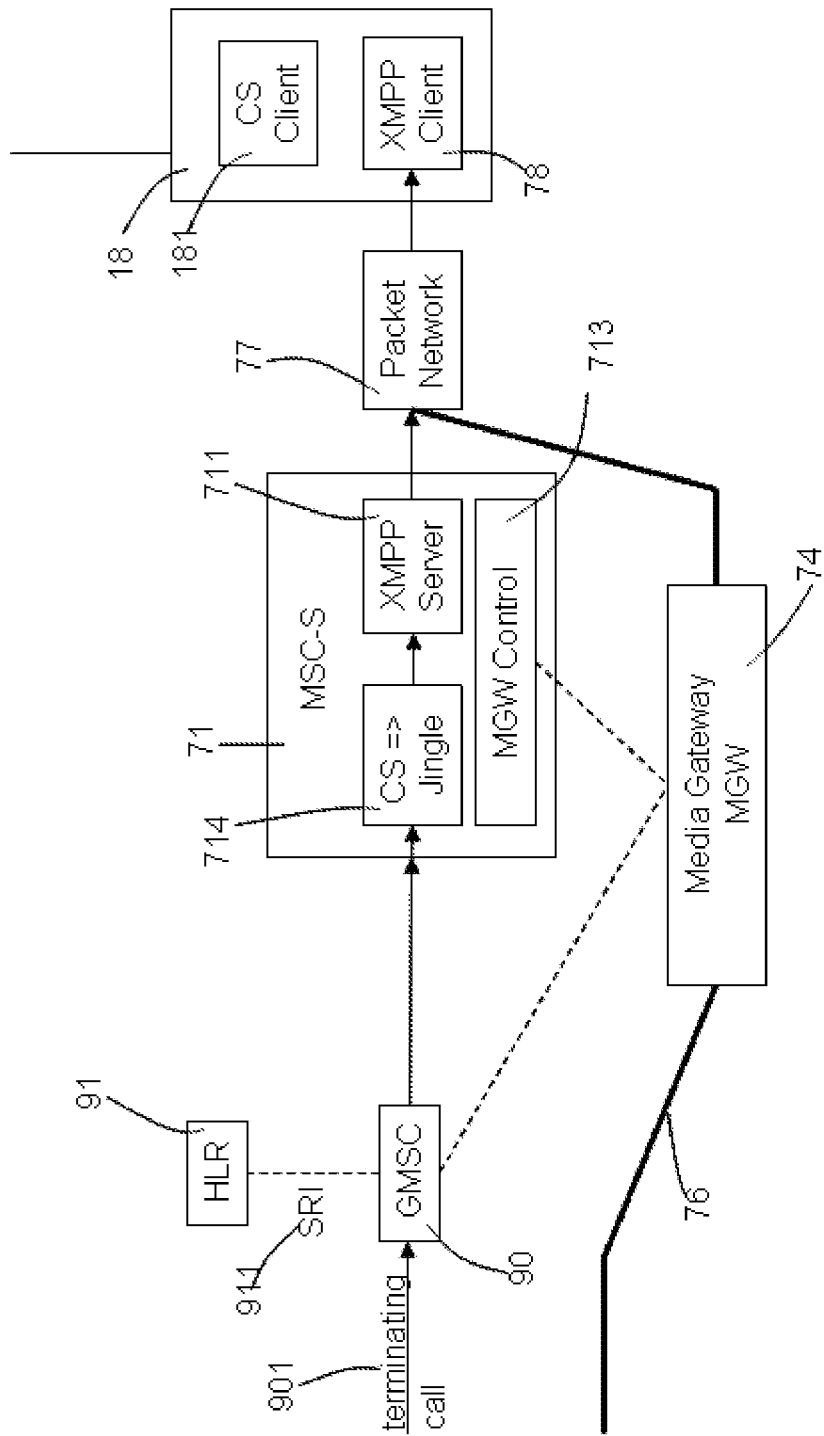
FIG. 9 shows a block diagram of an embodiment of a mobile communication network.
Figure 10:
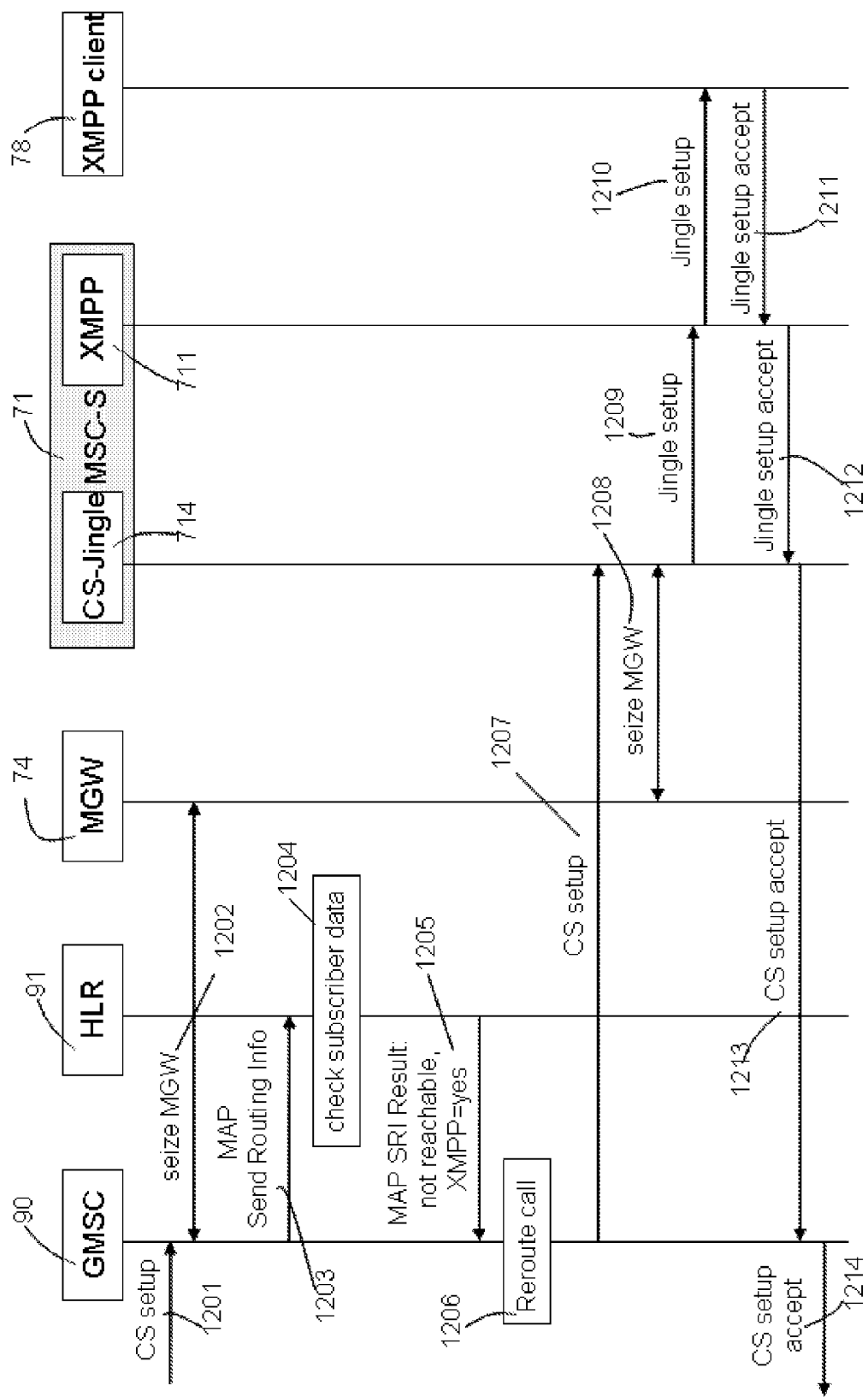
FIG. 10 shows an exemplary sequence diagram dataflow according to the block diagram of FIG. 9.

FIG. 9 shows a handling of terminating CS calls in a Gateway MSC 90 which queries call handling instructions by using the MAP Send Routing Information operation (SRI) 911 to a HLR 91. FIG. 10 depicts the signal flow diagram of the embodiment according FIG. 9. The mobile subscriber 18 comprises a CS client 181 which is adapted to connect to a CS mobile network over a CS radio access. The mobile subscriber 18 further comprises a XMPP client 78 which is adapted to connect to a packet switched network via a PS radio access. XMPP stands for any kind of instant messaging service.

In step 1, a terminating call 901 is received by GMSC 90 as a CS setup message 1201. The GMSC 90 is in control of at least one Media gateway node 74 and seizes MGW 74 resources in the next step 1202. In the next step 1203 the GMSC 90 interrogates the HLR 91 via the SRI 911 on how to continue the call. According this embodiment the HLR will determine in the next step 1204 that the subscriber is not reachable. This will happen if there is no serving MSC address found in the HLR subscriber record. The result returned to the GMSC 90 in the next step 1205 indicates that the subscriber is not reachable. Additionally, the HLR 91 provides to the GMSC 90 the information that a termination via an instant messaging service, like XMPP, shall be tried. This information is part of the subscriber record in the HLR 91.

Based on this received information the GMSC 90 will route the terminating call 901 to the MSC-S 71 which hosts the instant messaging server or XMPP server 711. There are two options to route 1206 the terminating call from the GMSC 91 to the hosting MSC-S 71 which hosts the XMPP server 711.

In the first option the destination B-number is replaced by the B-number of the hosting MSC-S 71 which hosts the XMPP server 711. This could be a generic, network wide XMPP breakout number. The original dialed B-number which identifies the original destination subscriber is added to the redirecting number information and is now part of the call setup signalling 1207 towards the hosting MSC-S 71. Any receiving redirecting number information can be replaced, as there is anyway no existing way to convey the redirecting information in the instant messaging service XMPP.

Another possibility of routing the terminating call to the hosting MSC-S 71 is to add a prefix to the destination B-number. The prefix will be used to route the call to the hosting MSC-S 71.

The hosting MSC-S 71 can be any of the existing MSC-S in the CS network. This simplifies the deployment as the operator has to upgrade only one MSC-S 71 with the XMPP server functionality 711. Practically at least two MSC-S have to be upgraded with XMPP server functionality 711 in order to provide redundancy. The network routing of the prefix/XMPP breakout number will make sure that an available MSC-S 71 with XMPP server functionality 711 is reached.

The hosting MSC 71 may also be the GMSC 90 or any other gateway node in the CS network.

In step 1207 the rerouted terminating call (CS setup) enters the hosting MSC-S 71. The hosting MSC-S seizes in a next step 1208 MGW 74 resources for the call. By checking the CS setup message, the MSC-S 71 determines that this terminating call has to be processed towards XMPP. The MSC-S extracts the destination number from the redirecting number field. The CS call setup signalling is then converted into XMPP, especially using the Jingle protocol. This conversions takes place in the CS=>Jingle function 714 allocated to the MSC-S 71. The CS=>Jingle function can be named as a message converter 714. The converted XMPP-Jingle signal is then forwarded 1209 to the integrated XMPP server 711 using the original B-number, converted to a JID (Jabber ID) as destination. The result of a conversion from the B-number, which can be a normal MSISDN, can be as follows: "B-MSISDN@XMPP.owndomain.com". The device part is omitted in this example. If the device part is not present, the XMPP Server will use priority mechanisms to target the request to one available XMPP client. The XMPP server 711 then takes care of delivering 1210 the call to the available XMPP client 78. The XMPP client returns 1211 a Jingle setup accept-message to the XMPP server 711 which message converter 714 converts the Jingle message back to a CS message and sends 1213 the CS setup accept message to the GMSC 90 which forwards 1214 the CS setup accept message to the originator.

In case no available XMPP client 78 could be found by the XMPP server 711, a negative indication is returned to the hosting MSC-S 71 which can then apply normal procedures for calls to non-reachable destinations.

Figure 11:
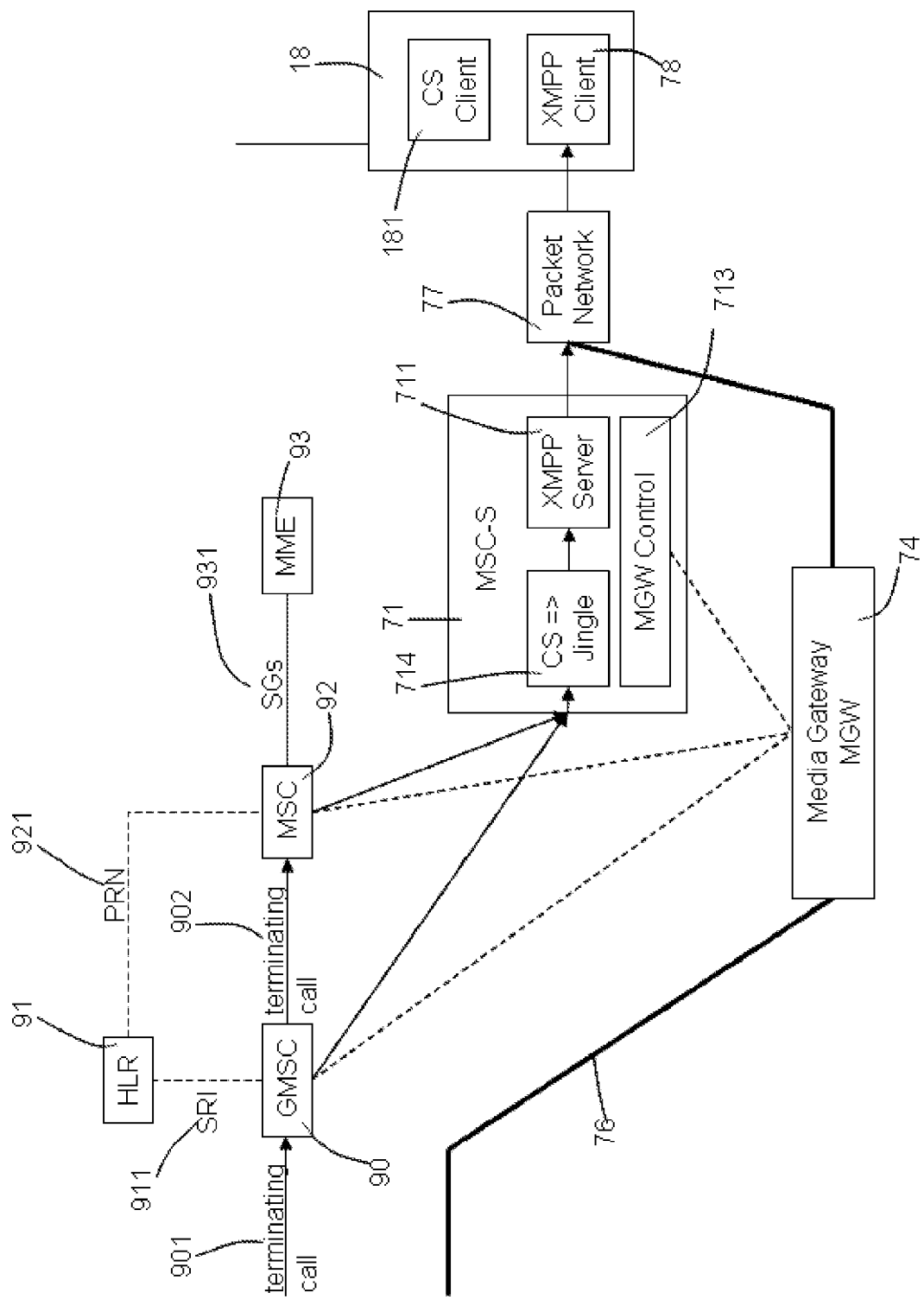
FIG. 11 shows a block diagram of another embodiment of a mobile communication network.
Figure 12:
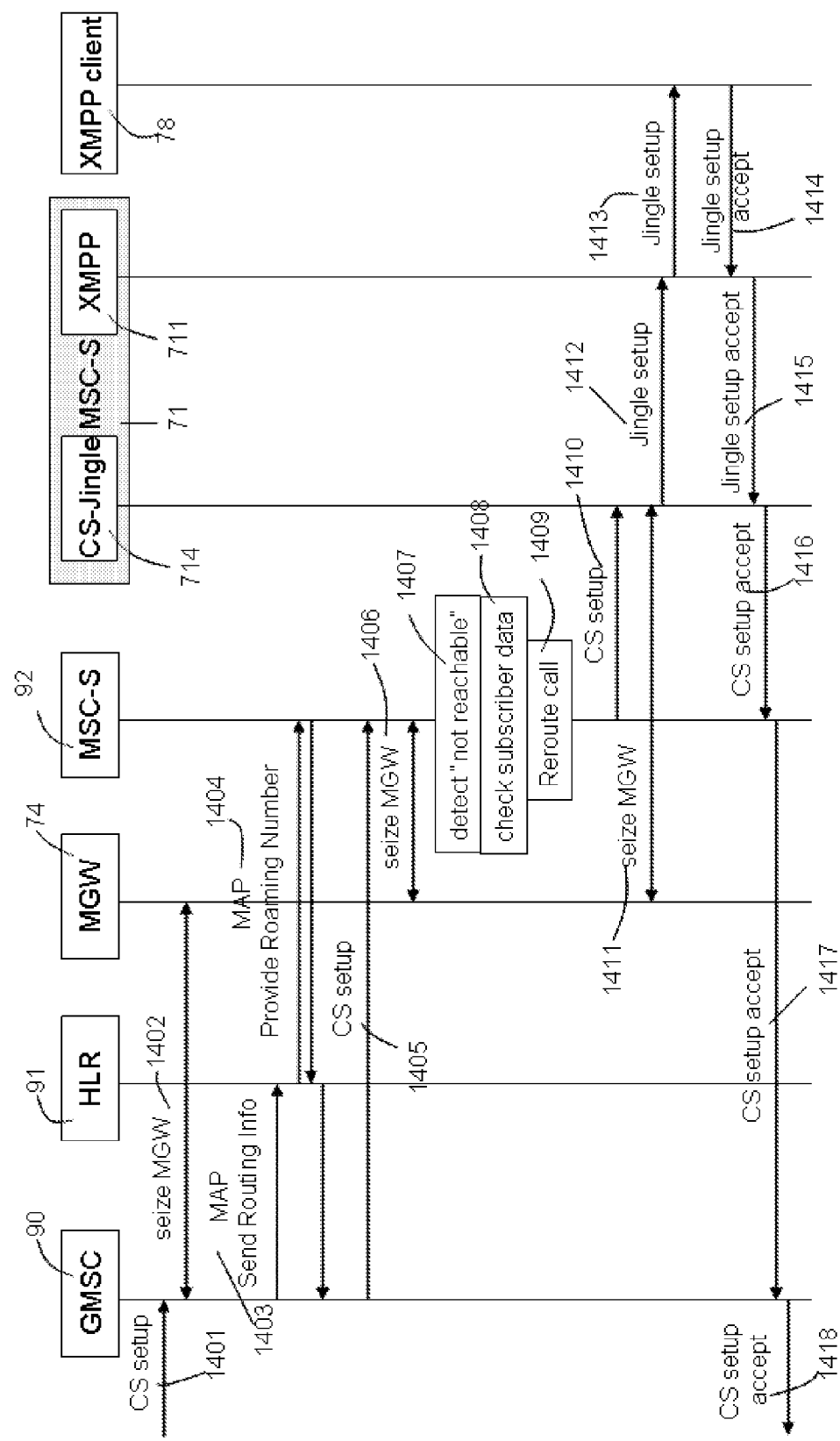
FIG. 12 shows an exemplary sequence diagram dataflow according to the block diagram of FIG. 11.

FIG. 11 depicts a further embodiment of a terminating call handling wherein FIG. 12 shows the corresponding signal flow diagram. In this embodiment, a terminating call 901 (CS setup message) enters the GMSC 90 in the first step 1401. The GMSC seizes 1402 a controlled Media Gateway (MGW) 74 and queries 1403 the HLR on information how to continue the call setup. In this case the HLR has found a serving MSC-S 92 in the subscriber record. Further the HLR requests in the next steps 1404 to provide a roaming number, which is then returned to the GMSC 90 via the HLR 91. The GMSC 90 routes in a further step 1405 the CS setup message or terminating call 902 to the serving MSC-S 92. The MSC-S 92 is in control of a MGW 74 and seizes resources for the call in the next step 1406. The MSC-S 92 then tries to deliver the call setup message to the CS client in the terminal but detects a "non-reachable" condition 1407 by not receiving a reply to a CS paging attempt. It might also be possible that the assignment of a radio traffic channel fails. If the subscriber 18 is attached to a Long Term Evolution (LTE) radio access which is a packet switched radio access, the subscriber is also not reachable for paging on CS radio access. The MSC-S 92 knows about the attachment of the subscriber to the LTE radio because the Mobility Management Entity (MME) 93, which is a network management entity in a Service Architecture Evolution (SAE) network for LTE, is connected via a SGs interface with the MSC-S. So if the subscriber is attached via SGs interface to the MSC-S 92, the subscriber 18 is not reachable via CS even if the address of the MSC-S 92 is stored in the HLR 91 as the networks element which is in control of the subscriber 18.

A CS fallback (CSFB) mechanism would have to be applied (paging on LTE) to force the subscriber terminal to re-attach to CS radio in order to handle this call. This will cause network traffic, service degradation due to lower bandwidth and the danger of data losses is very high. To avoid the CSFB situation when the subscriber is attached via SGs interface to a MSC-S 92 it is proposed to use the packet switched (PS) based instant messaging protocol and the XMPP client 78 in the mobile subscriber 18 to transfer speech data via the XMPP Jingle protocol in a Voice over IP connection.

The XMPP subscriber information is also stored in the VLR of the MSC-S 92 so that if the CS client 181 of the mobile subscriber 18 is found not to be reachable via CS access 1408 and a XMPP client 78 is allocated to the mobile subscriber 18 according to the records the terminating CS call is routed 1409 towards the hosting MSC-S 71 as the setup call message 1410 which hosts the XMPP server 711. This may be the MSC-S 92 handling the call already. In order to route the terminating CS call, the options already described for FIGS. 9 and 10 applies. After allocating the MGW 74 resources for this call, the further handling of the setup call including the conversion (steps 1412 to 1417) is comparable to the call handling in FIG. 10 (steps 1209 to 1214).

Figure 13:
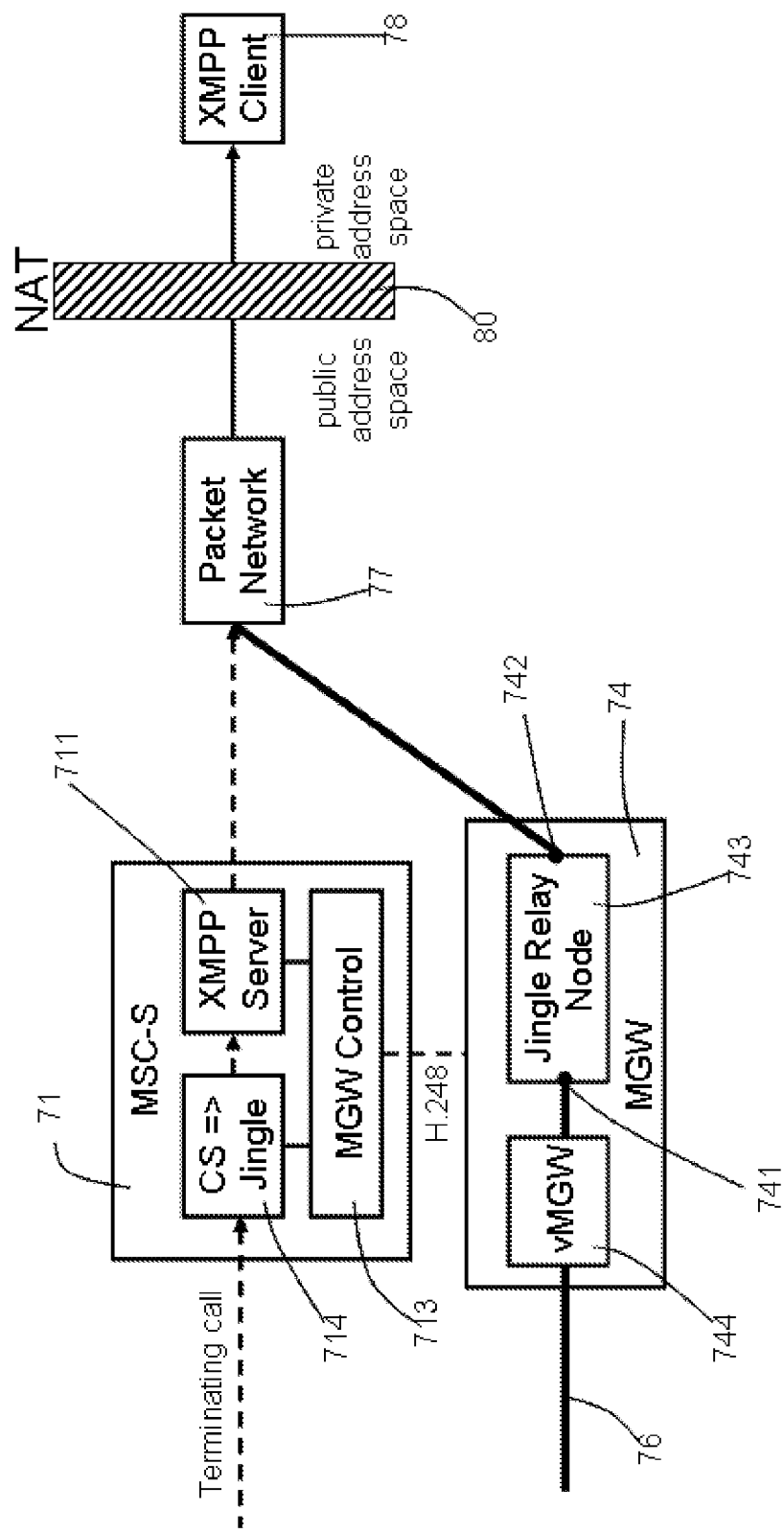
FIG. 13 shows a block diagram of a further embodiment of a mobile communication network.

FIG. 13 shows a situation in which the XMPP client 78 is located behind a firewall 80 which is doing NAT between a private address space in which the XMPP client 78 is located and the public address space in which the hosting MSC-S 71 and the MGW 74 is located. FIG. 13 shows in more detail the handling in the MSC-S 71 hosting the XMPP server 711. If a MGW 74 has already been seized the related information is received in the incoming call request as normal. The MSC-S 71 tries to re-use an already seized MGW 74. If this is not possible a new MGW is seized by the MSC-S 71.

After the terminating call is received by the MSC-S 71, it is converted by the message converter 714 into a Jingle setup message and is forwarded via the XMPP server 711 over a packet network 77 to a XMPP client 78. In the embodiment of FIG. 13 the XMPP client 78 is located behind a firewall 80 in a private address space, like a LAN. The firewall 80 is doing NAT for all inbound and outbound communications. Therefore the private address space of the XMPP client 78 cannot be used for the user plane setup. Further details are described in relation to FIG. 8.

FIG. 13 further depicts a virtual MGW 744 which is mapped with a H.248 request from the MGW control function 713. A Virtual Media Gateway 744 consists of a set of statically partitioned physical terminations and/or sets of ephemeral terminations. A physical termination is controlled by one Control Server 71 only. Each of the virtual Media Gateways 744 appears to the Control Server 71 as a complete Media Gateway client. Each virtual Media Gateway has its own Root Termination. This concept enables communication between one physical MGW node 74 and a number of Control Server nodes 71, 90, 92 at the same time. With the help of Virtual MGWs a m:n relationship between Control Servers and Media Gateways is achieved.

When the re-routed terminating CS call enters the MSC-S 71 the MSC-S 71 seizes MGW resources by allocating a vMGW instance 744. When the XMPP server 711 uses the same MGW control function 713 to access the MGW and the Relay Jingle Service the MGW 74 allocates a virtual instance as a relay function 743 of that Jingle Relay Service. The local port address 742 and the remote port address 741 are then properties of the relay function 743. The MGW 74 optimizes internally the traffic between internal ports, such as the remote port 741 of the relay function 743 and the vMGW instance 744. Therefore only a single physical MGW is needed to provide the interworking between the CS network and the XMPP access. No additional hardware is required for this. The relay function 743 can also be named as Jingle Relay node 743 which is integrated as a virtual instance in the MGW 74. This virtual instance 743 appears to the XMPP server 711 as a complete Jingle Relay node 743 including a local and remote port. The virtual instance 743 consists of a set of statically partitioned physical terminations and/or sets of ephemeral terminations.

The message converter 714 is acting as a further XMPP client for the integrated XMPP server 711 and the XMPP client 78. The XMPP client 78 therefore establishes a communication to the message converter 714, acting as a XMPP client. In correlation to FIG. 8, the message converter 714 is comparable to the Client B 79. When the XMPP client 78 requests a relay service from the XMPP server 711, the relay of media data is performed between the media resources controlled by the message converter 714 via the MGW control function 713, i.e. the controlled VMGW instance 744 and the XMPP client 78. Therefore, the message converter must know the address of the remote port 741 of the Jingle Relay node 743. This address will be provided by the XMPP client 78 which requests the Jingle Relay due to a NAT situation in which the XMPP client 78 is not visible for the message converter 714 which acts as a XMPP client.

Figure 14:
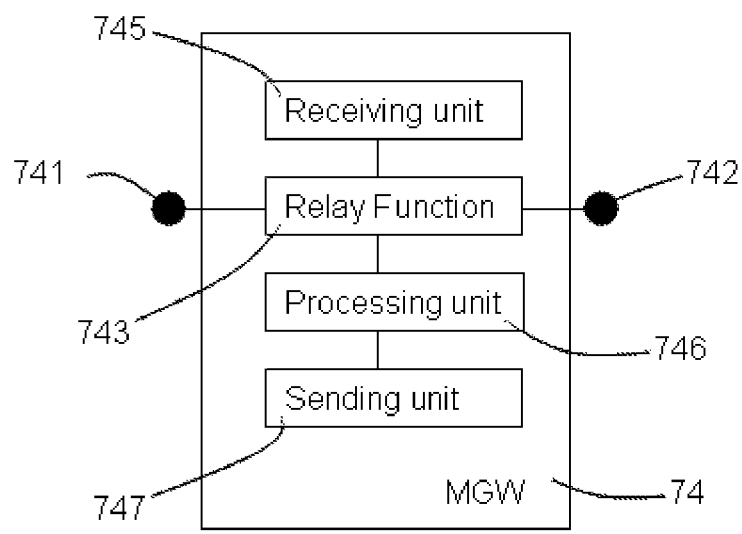
FIG. 14 shows an embodiment of a media gateway node.

FIG. 14 depicts an embodiment of a media gateway node 74 which is controlled by the hosting switching node 71 via a MGW Control function 713 over a H.248 protocol. The MGW comprises a receiving unit 745, adapted to receive a request for providing a relay function 743 between an instant communication client 132, 78 and the message converter 714 associated to the hosting switching node 71. The request can be sent in form of a H.248 message from the MGW control function 713 to the receiving unit 745. Further the MGW 74 comprises a processing unit 746, adapted to determine an address of a local port 742 to which the instant communication client 132, 78 can be terminated and an address of a remote port 741 to which the message converter 714 can be terminated. The relay function 743 is adapted to relay media data between the local port 742 and the remote port 741. The MGW 74 further comprises a sending unit 747, adapted to send to the switching node 71 or to the MGW control unit 713 of the hosting switching unit 71 the address of the local port 742 and the address of the remote port 741.

Figure 15:
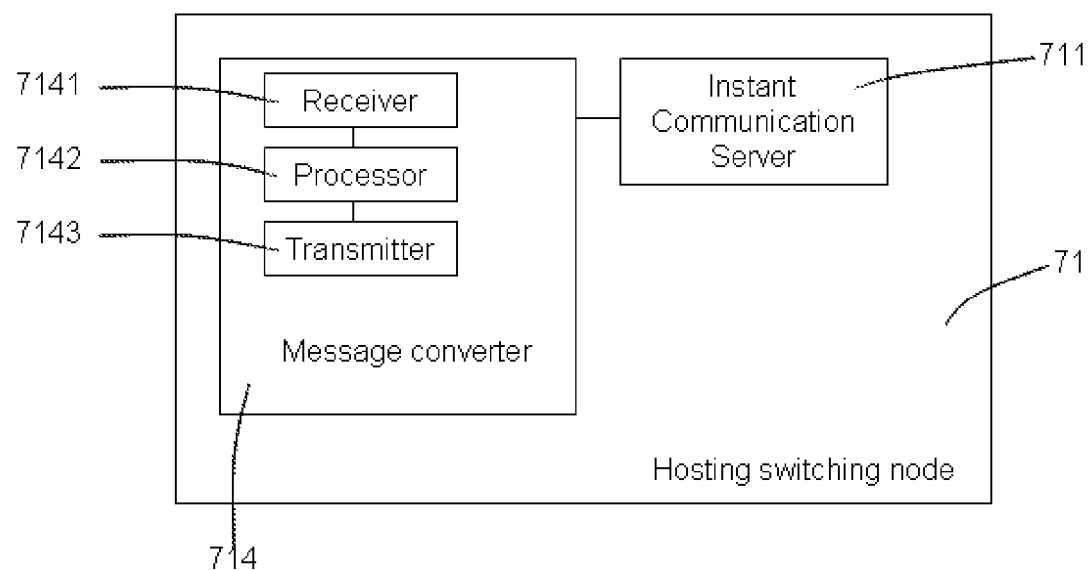
FIG. 15 shows an embodiment of a hosting switching node.

FIG. 15 depicts an embodiment of a hosting switching node 71 of a circuit switched, CS, network comprising an instant communication server 711 which is adapted to communicate over an instant communication protocol with an instant communication client 78. The instant communication client 78 is associated to a mobile subscriber 18 of the CS network. The hosting switching node 71 further comprises a message converter 714 which comprises a receiver 7141, adapted to receive a CS setup message for setup a CS call to the mobile subscriber 18, a processor 7142, adapted to convert the CS setup message into a converted setup message which is based on the instant messaging protocol and a transmitter 7413, adapted to transmit the converted setup message to the instant communication server 711.

The invention claimed is:

1. A method of establishing a circuit switched (CS) call to a mobile subscriber of a CS network, wherein the mobile subscriber comprises a CS client which is adapted to connect to a CS mobile network over a CS radio access and the mobile subscriber comprises an instant communication client which is adapted to communicate via an instant messaging protocol with an instant communication server, and wherein the instant communication server is associated to a hosting switching node of the CS network, the method comprises:
    receiving, by a switching node of the CS network, a CS setup message for terminating a CS call at the CS client of the mobile subscriber of the CS network;
    detecting, by the switching node of the CS network, that the mobile subscriber of the CS network is not reachable over the CS network;
    based on the detecting that the mobile subscriber of the CS network is not reachable over the CS network, routing the CS setup message to the hosting switching node that is associated to the instant communication server;
    forwarding the CS setup message to a message converter associated to the hosting switching node;
    converting, by the message converter associated to the hosting switching node, the CS setup message into a converted setup message according to the instant messaging protocol;
    forwarding the converted setup message to the instant communication server; and
    forwarding, by the instant communication server, the converted setup message to the instant communication client of the mobile subscriber of the CS network.

2. A method according to claim 1, wherein the detection that the mobile subscriber is not reachable is performed by checking the subscriber data in a Home Location Register (HLR) to determine that an address of a switching node serving the mobile subscriber is not available.

3. A method according to claim 1, wherein the detection that the mobile subscriber is not reachable is performed by determining, by the switching node, that the mobile subscriber is not attached to a Long Term Evolution (LTE) radio access node.

4. A method according to claim 3, wherein the switching node is connected via an interface to a Mobility Management Entity (MME) of a Service Architecture Evolution (SAE) network.

5. A method according to claim 1, wherein the routing is performed by replacing, in the CS setup message, the address of the mobile subscriber by the address of the hosting switching node.

6. A method according to claim 1, wherein the routing is performed by adding a prefix number to the mobile subscriber address in the CS setup message.

7. A method according to claim 1, wherein the method further comprises:
  receiving, by the instant communication server, a setup accept message from the instant communication client;
  converting the setup accept message into a CS setup accept message; and
  forwarding the CS setup accept message to an originator of the CS setup message.

8. A method according to claim 1, wherein the method further comprises:
  receiving, by the instant communication server, a relay request from the instant communication client;
  selecting, by the hosting switching node, a media gateway node (MGW) which is controlled by the hosting switching node;
  allocating, by the hosting switching node, a relay function in the MGW;
  determining, by the hosting switching node, an address of a local port of the relay function to which the instant communication client can be terminated and an address of a remote port of the relay function to which the message converter can be terminated; and
  providing, by the instant communication server, the address of the local port and the address of the remote port to the instant communication client.

9. A method according to claim 8, wherein the method further comprises sending, by the instant communication client, a message to the message converter which comprises the address of the remote port of the relay function.

10. A method according to claim 8,
  wherein the instant communication client is located behind a firewall which is configured to perform a network address translation (NAT) between a private address space in which the instant communication client is located and a public address space in which the MGW is located, and
  wherein the relay function is adapted to provide a connection through the firewall to the instant communication client.

11. A method according to claim 1, wherein the instant messaging protocol is based on a packet switched (PS) network.

12. A method according to claim 11, wherein the instant messaging protocol is an Extensible Messaging and Presence Protocol (XMPP) and the communication server is a XMPP server and the communication client is a XMPP client.

13. A hosting switching node of a circuit switched, CS, network comprising an instant communication server which is adapted to communicate over an instant communication protocol with an instant communication client which is associated to a mobile subscriber of the CS network that is not reachable over the CS network, wherein the hosting switching node further comprises a message converter which comprises:
  a receiver, adapted to receive a CS setup message for setup of a CS call to a CS client of the mobile subscriber of the CS network that is not reachable over the CS network;
  a processor, adapted to convert the CS setup message into a converted setup message which is based on the instant messaging protocol; and
  a transmitter, adapted to transmit the converted setup message to the instant communication server.

14. A hosting switching node according to claim 13, wherein the instant communication server is further adapted to send the converted setup message to the instant communication client of the mobile subscriber of the CS network.

15. A hosting switching node according to claim 13, adapted to perform the method of claim 1.

\* \* \* \* \*

UNITED STATES PATENT AND TRADEMARK OFFICE
CERTIFICATE OF CORRECTION

| | |
|---|---|
| PATENT NO. | : 9,204,471 B2 |
| APPLICATION NO. | : 13/994896 |
| DATED | : December 1, 2015 |
| INVENTOR(S) | : Witzel |

It is certified that error appears in the above-identified patent and that said Letters Patent is hereby corrected as shown below:

Specification

In Column 3, Line 66, delete "two XMPP client," and insert -- two XMPP clients, --, therefor.

In Column 6, Line 7, delete "a instant" and insert -- an instant --, therefor.

In Column 8, Line 15, delete "s2s component 25" and insert -- s2s component 33 --, therefor.

In Column 9, Line 10, delete "can be user" and insert -- can be used --, therefor.

In Column 13, Line 22, delete "GMSC 91" and insert -- GMSC 90 --, therefor.

In Column 15, Line 59, delete "VMGW instance 744" and insert -- vMGW instance 744 --, therefor.

In Column 16, Lines 29-30, delete "transmitter 7413," and insert -- transmitter 7143, --, therefor.

Signed and Sealed this
Thirty-first Day of May, 2016

Michelle K. Lee
*Director of the United States Patent and Trademark Office*